(12) United States Patent
Sandor et al.

(10) Patent No.: US 6,559,221 B2
(45) Date of Patent: May 6, 2003

(54) SILANE-CONTAINING POLYMER DISPERSIONS FOR TILE CEMENTS

(75) Inventors: Mario Sandor, Obrigheim (DE); Joachim Pakusch, Speyer (DE); Wolfgang Hümmer, Birkenheide (DE); Hans-Jürgen Denu, Friedelsheim (DE); Rolf Gulden, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/927,390

(22) Filed: Aug. 13, 2001

(65) Prior Publication Data

US 2002/0040096 A1 Apr. 4, 2002

(30) Foreign Application Priority Data

Aug. 18, 2000 (DE) .......................................... 100 40 407

(51) Int. Cl.[7] ......................... C08L 43/04; C08L 41/00; C08K 5/21; C08K 5/54
(52) U.S. Cl. ....................... 524/547; 524/211; 524/213; 524/806; 524/812
(58) Field of Search ................................. 524/457, 492, 524/543, 547, 609, 806, 812, 211, 213

(56) References Cited

U.S. PATENT DOCUMENTS

| | | | |
|---|---|---|---|
| 3,983,291 A | * | 9/1976 | Chang et al. ................ 428/290 |
| 4,654,397 A | | 3/1987 | Mueller-Mall et al. |
| 5,100,948 A | | 3/1992 | Aydin et al. |
| 6,194,514 B1 | * | 2/2001 | Scheuermann et al. ...... 524/833 |

FOREIGN PATENT DOCUMENTS

| | | |
|---|---|---|
| EP | 0 035 332 | 9/1981 |
| EP | 0 184 091 | 6/1986 |
| EP | 0 366 969 | 5/1990 |

* cited by examiner

Primary Examiner—Tae H. Yoon
(74) Attorney, Agent, or Firm—Oblon, Spivak, McClelland, Maier & Neustadt, P.C.

(57) ABSTRACT

An aqueous polymer dispersion, wherein the dispersion contains from 0.0001 to 1 mol of a hydrolyzable silicon group and from 0.0001 to 1 mol of a urea or thiourea group, based, in each case, on 100 g of the polymer present in the dispersion.

20 Claims, No Drawings

SILANE-CONTAINING POLYMER DISPERSIONS FOR TILE CEMENTS

DESCRIPTION

The invention relates to an aqueous polymer dispersion, wherein the dispersion contains from 0.0001 to 1 mol of a hydrolyzable silicon group and from 0.0001 to 1 mol of a urea or thiourea group, based, in each case, on 100 g of the polymers present in the dispersion.

The invention also relates to a method of using the polymer dispersions as binding agents for adhesives and sealants, particularly for tile cements.

EP-A 35,332 discloses binding agents for ceramic tiles, which have a content of hydrolyzable silicon groups arising from copolymerization of ethylenically unsaturated silicon compounds. EP-A 366,969 also describes binding agents containing hydrolyzable silicon groups.

The water resistance of adhesive bonds is raised by a content of hydrolyzable silicon compounds.

It is desirable that adhesive bonds should have not only high water resistance but also optimal heat resistance. Prior art binding agents are still unsatisfactory with regard to their heat resistance.

Polymers containing urea groups are disclosed in EP-A 184,091 for example.

Thus the present invention relates to binding agents for adhesives giving water-resistant and heat-resistant adhesive bonds.

Accordingly we have found the polymer dispersion defined above and a method of using the same as a binding agent for adhesives and sealants, particularly for use on ceramic tiles.

The aqueous polymer dispersion of the invention contains at least 0.0001 mol and preferably at least 0.0005 mol of a urea or thiourea group, while the upper limit is not more than 1 mol, preferably not more than 0.5 mol, more preferably not more than 0.1 mol, very preferably not more than 0.05 mol and most preferably not more than 0.01 mol, based, in each case, on 100 g of the polymers dispersed in the dispersion.

In particular, the group under consideration is a urea or thiourea group of the formula

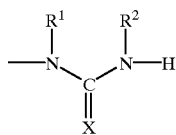

in which $R^1$ and $R^2$ independently stand for a hydrogen atom or a $C_1$–$C_5$ alkyl group or $R^1$ and $R^2$ together stand for a bridging $C_1$–$C_4$ alkylene group, which can be mono- or di-substituted by a $C_1$–$C_4$ alkoxy group or a hydroxyl group, and X stands for an oxygen or sulfur atom.

Preferably $R^1$ and $R^2$ independently stand for hydrogen or a $C_1$–$C_5$ alkyl group or $R^1$ and $R^2$ together stand for a bridging $C_2$–$C_4$ alkyl group. X preferably stands for O.

In a particularly preferred embodiment, $R^1$ and $R^2$ together stand for a $C_2$–$C_4$ alkylene group, particularly an ethylene group, connecting the two nitrogens.

The urea or thiourea group can be a component of a low-molecular, non-polymeric compound dissolved or dispersed in water as continuous phase.

In particular, such compounds have at least 2 and preferably 2–4 urea or thiourea groups.

Preferably the urea or thiourea group is bonded to the polymers dispersed in the dispersion.

These polymers can be polycondensates, eg polyesters, or addition polymers, eg polyurethanes.

Preferably they are polymers which can be obtained by free-radical or ionic polymerization of ethylenically unsaturated compounds (monomers) (ie radical-polymerized polymers).

The urea or thiourea group can be bonded to the polymer by, say, polymer-analogous conversion.

Preferably synthesis of the polymers is carried out in the presence of suitable starting compounds already containing a urea or thiourea group. In the preferred embodiment involving radical-polymerized polymers, polymerization is preferably carried out using monomers containing a urea or thiourea group (monomer A).

Such monomers have, in addition to the urea or thiourea group, at least one, preferably one, copolymerizable ethylenically unsaturated group.

This copolymerizable, ethylenically unsaturated group in monomer A is preferably a (meth)acrylic group.

Suitable monomers A preferably contain one copolymerizable, ethylenically unsaturated group and one group of formula I.

Preferably the compound used is one of the formula

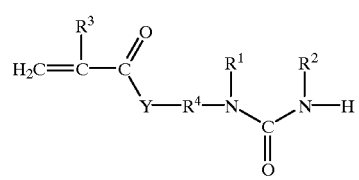

in which $R^3$ stands for a hydrogen atom or a methyl group, Y for —O— or —NH— and $R^4$ for a divalent $C_1$–$C_{10}$ alkylene group, and $R^1$, $R^2$ have the meanings stated above.

Preferably $R^3$ stands for hydrogen or a methyl group, Y for —O—, $R^4$ for a $C_2$–$C_6$ alkylene group and $R^1$ and $R^2$ together stand for a $C_2$–$C_4$ alkylene group.

Particular preference is given to 1-(2-methacryloxyethyl) imidazolinone-2, known as ureidoethylene methacrylate ($R^1$, $R^2$=ethylene; Y=O; $R^3$=methyl; $R^4$=ethylene; abbreviation=UMA):

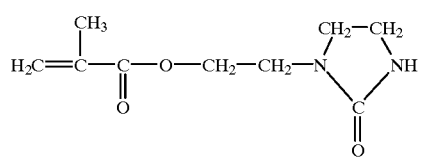

or ureidoethylene acrylate.

The aqueous polymer dispersion of the invention also contains a hydrolyzable silicon group, ie a silicon group which, following hydrolysis, has at least one hydroxyl group directly attached to the Si atom.

In particular, it is a silicon group of the formula

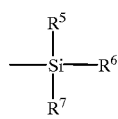
III in which $R^5$ to $R^7$ each independently stand for a $C_1$–$C_8$, in particular $C_1$–$C_4$, alkyl or alkoxy group, provided that at least one of the radicals $R^5$ to $R^7$ denotes an alkoxy group.

In a particularly preferred embodiment, all radicals $R^5$–$R^7$ stand for a $C_1$–$C_8$, preferably $C_1$–$C_4$, alkoxy group, in particular a methoxy group.

The content of hydrolyzable silicon group in the aqueous polymer dispersion is from 0.0001 to 1 mol. Preferably the content is at least 0.0005 mol, while the upper limit is not more than 1 mol, preferably not more than 0.5 mol, more preferably not more than 0.1 mol, very preferably not more than 0.05 mol and most preferably not more than 0.01 mol, based, in each case, on 100 g of the polymers dispersed in the dispersion.

The molar ratio of the urea or thiourea group to the silicon group is preferably from 1:10 to 10:1 and more preferably from 1:5 to 5:1.

The hydrolyzable silicon group may also be a component of a low-molecular, non-polymeric compound dissolved or dispersed in the dispersant water.

In particular, such compounds have at least 2, preferably from 2 to 4, hydrolyzable silicon groups. If these compounds have only one hydrolyzable silicon group, this silicon group preferably has at least two hydrolyzable groups however.

Preferably the hydrolyzable silicon group is bonded to the polymer. Very preferably, both the urea or thiourea group and the hydrolyzable silicon group are bonded to the polymer.

In the preferred embodiment involving radical-polymerized polymer, monomers containing a hydrolyzable silicon group can be used, for example, as comonomers in the polymer dispersion (monomer B). Also suitable are polymerization regulators containing, for example, one —S—H group and one hydrolyzable silicon group (regulators B).

Such regulators B are attached to the ends of the polymer chains during free-radical polymerization.

Suitable monomers B are eg those of the formula

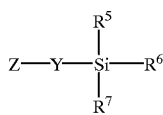
IV in which Z stands for a
vinyl group ($H_2C$=$CH$—),
acrylic group

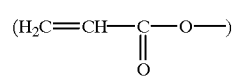

or methacrylic group

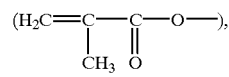

Y stands for a binding link containing up to 20 carbons, whilst Y may be omitted if Z stands for a vinyl group, and $R^5$ to $R^7$ have the meanings stated above.

Preferably Z stands for a (meth)acrylic group and Y for a $C_1$–$C_6$ alkylene group.

Suitable regulators B are eg those of the formula

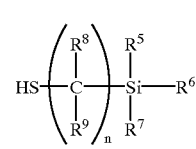
V in which $R^8$ and $R^9$ independently stand for a hydrogen atom or a $C_1$–$C_4$ alkyl group, n is a number from 0 to 10, preferably from 1 to 8, and $R^5$–$R^7$ have the meanings stated above.

The polymers dispersed in the polymer dispersion of the invention are preferably radical-polymerized polymers.

Preferably the radical-polymerized polymer comprises so-called main monomers to an extent of at least 40 wt % and more preferably at least 60 wt % and most preferably at least 80 wt %.

The main monomers are selected from the group comprising $C_1$–$C_{20}$ alkyl (meth)acrylates, vinyl esters of carboxylic acids containing up to 20 carbons, vinyl aromatic compounds containing up to 20 carbons, ethylenically unsaturated nitriles, vinyl halides, vinyl ethers of alcohols containing from 1 to 10 carbons, aliphatic hydrocarbons containing from 2 to 8 carbons and having 1 or 2 double bonds, or mixtures of these monomers.

The following may be mentioned by way of example: alkyl (meth)acrylates containing a $C_1$–$C_{10}$ alkyl group, such as methyl methacrylate, methyl acrylate, n-butyl acrylate, ethyl acrylate and 2-ethylhexyl acrylate.

In particular, mixtures of alkyl (meth)acrylates are suitable.

Vinyl esters of carboxylic acids containing from 1 to 20 carbons are eg vinyl laurate, vinyl stearate, vinyl propionate, vinyl esters of Versatic acid and vinyl acetate.

Suitable vinylaromatic compounds are vinyl toluene, α- and π-methylstyrenes, α-butylstyrene, 4-n-butylstyrene, 4-n-decylstyrene and preferably styrene. Examples of nitriles are acrylonitrile and methacrylonitrile.

The vinyl halides are ethylenically unsaturated compounds that are substituted by chlorine, fluorine or bromine, preferably vinyl chloride and vinylidene chloride.

Vinyl ethers which may be mentioned are eg vinyl methyl ether or vinyl isobutyl ether. Preference is given to a vinyl ether of alcohols containing from 1 to 4 carbons.

As hydrocarbons containing from 2 to 8 carbons and two olefinic double bonds there may be mentioned butadiene, isoprene, and chloroprene, and those containing one double bond are eg ethylene and propylene.

The main monomers are preferably $C_1$–$C_{10}$ alkyl (meth) acrylates, particularly $C_1$–$C_8$ alkyl (meth)acrylates and vinyl aromatic compounds, particularly styrene, and mixtures thereof.

Very special preference is given to methyl acrylate, methyl methacrylate, ethyl acrylate, n-butyl acrylate, n-hexyl acrylate, octyl acrylate and 2-ethylhexyl acrylate, styrene and mixtures of these monomers.

In addition to the main monomers, the radical-polymerized polymer can contain further monomers, eg monomers containing carboxylic acid, sulfonic acid or phosphonic acid groups. Preference is given to carboxylic acid groups. As examples thereof there may be mentioned acrylic acid, methacrylic acid, itaconic acid, maleic acid or fumaric acid.

Other monomers are eg monomers containing hydroxyl groups, particularly $C_1$–$C_{10}$ hydroxyalkyl (meth)acrylates and (meth)acrylamide.

As examples of further monomers there may be mentioned phenyloxy-ethyl glycol mono(meth)acrylate, glycidyl acrylate, glycidyl methacrylate and amino (meth)acrylates such as 2-aminoethyl (meth)acrylate.

Other possible monomers include crosslinking monomers.

In the case of the aforementioned preferred embodiments, monomers containing urea or thiourea groups or monomers containing hydrolyzable silicon groups are also used.

Synthesis of the radical-polymerized polymers is carried out, in a preferred embodiment, by emulsion polymerization; they are therefore emulsion polymers.

Alternatively however, preparation can be effected by, say, solvent polymerization followed by dispersion in water.

In emulsion polymerization, ionic and/or non-ionic emulsifiers and/or protective colloids or stabilizing agents are used as surface-active compounds.

A detailed description of suitable protective colloids is given in Houben-Weyl, Methoden der organischen Chemie, Vol. XIV/1, "Macromolecular Materials", Georg-Thieme-Verlag, Stuttgart, 1961, pp 411 to 420. Suitable emulsifiers are anionic, cationic and non-ionic emulsifiers. Preferably, supplementary surfactants used are exclusively emulsifiers, whose molecular weight, unlike the protective colloids, is usually below 2000 g/mol. Of course, when use is made of mixtures of surfactants, the constituents have to be compatible with each other, which can be checked if necessary by a few preliminary tests. Preferably, anionic and non-ionic emulsifiers are used as surfactants. Commonly used supplementary emulsifiers are for example ethoxylated fatty alcohols (comprising $C_8$–$C_{36}$ alkyl; degree of ethoxylation: 3 to 50), ethoxylated mono-, di- and tri-($C_4$–$C_9$ alkyl)phenols (degree of ethoxylation: 3 to 50), alkali metal salts of dialkyl esters of sulfosuccinic acid and also alkali metal and ammonium salts of ($C_8$–$C_{12}$ alkyl) sulfates, of ethoxylated $C_{12}$–$C_{18}$ alkanols (degree of ethoxylation: 4 to 30), of ethoxylated ($C_4$–$C_9$ alkyl)phenols (degree of ethoxylation: 3 to 50), of ($C_{12}$–$C_{18}$ alkyl)sulfonic acids and of ($C_9$–$C_{18}$ alkyl)arylsulfonic acids.

Other suitable emulsifiers are compounds of the general formula II

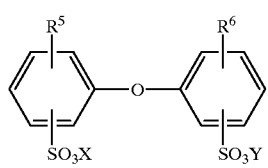

(II)

in which $R^5$ and $R^6$ denote hydrogen or $C_4$–$C_{14}$ alkyl but are not both hydrogen, and X and Y can be alkali metal ions and/or ammonium ions. Preferably, $R^5$, $R^6$ denote linear or branched alkyl groups containing from 6 to 18 carbons or hydrogen and particularly containing 6, 12 and 16 carbons, whilst $R^5$ and $R^6$ are not both hydrogen. X and Y are preferably sodium, potassium or ammonium ions, sodium being particularly preferred. Compounds II in which X and Y denote sodium, $R^5$ denotes a branched alkyl group containing 12 carbons and $R^6$ is hydrogen or $R^5$, are particularly advantageous. Frequently industrial mixtures are used containing a portion of from 50 to 90 wt % of the monoalkylated product, for example Dowfax® 2A1 (trademark of Dow Chemical Company).

Suitable emulsifiers are also given in Houben-Weyl, Methoden der organischen Chemie, Vol. 14/1, "Macromolecular Materials", Georg Thieme Verlag, Stuttgart, 1961, page(s) from 192 to 208.

Trade Names of emulsifiers are eg Dowfax®2 A1, Emulan® NP 50, Dextrol® OC 50, Emulsifier 825, Emulsifier 825 S, Emulan® OG, Texapol® NSO, Nekanil® 904 S, Lumiten® I-RA, Lumiten E 3065, Disponil FES 77, Lutensol AT 18, Steinapol VSL and Emulphor NPS 25.

The surfactant is usually employed in amounts of from 0.1 to 10 wt %, based on the monomers to be polymerized.

Water-soluble initiators for emulsion polymerization are eg ammonium and alkali metal salts of peroxydisulfuric acid, eg sodium peroxodisulfate, hydrogen peroxide or organic peroxides, eg tert-butyl hydroperoxide.

So-called redox initiator systems are also suitable.

Redox initiator systems are made up of at least one, usually inorganic, reducing agent and one inorganic or organic oxidizing agent.

The oxidizing component is for example one of the aforementioned initiators for the emulsion polymerization.

The reducing components are eg alkali metal salts of sulfurous acid, such as sodium sulfite, sodium hydrogensulfite, alkali metal salts of pyrosulfurous acid such as sodium disulfite, bisulfite addition compounds of aliphatic aldehydes and ketones, such as acetone bisulfite or reducing agents such as hydroxymethane-sulfinic acid and the salts thereof, or ascorbic acid. The redox initiator systems can be used together with soluble metal compounds whose metallic component can exist in more than one valence state.

Common redox initiator systems are eg ascorbic acid/iron (II) sulfate/sodium peroxodisulfate, tert-butylhydroperoxide/sodium disulfite, tert-butyl hydroperoxide/sodium hydroxymethane sulfinic acid. The individual components, eg the reducing component, may be mixtures, eg a mixture of the sodium salt of hydroxymethane-sulfinic acid and sodium disulfite.

The said compounds are mostly used in the form of aqueous solutions, the lower concentration limit being determined by the amount of water acceptable in the dispersion and the upper concentration limit by the solubility of the respective compound in water. Generally, the concentration is from 0.1 to 30 wt %, preferably from 0.5 to 20 wt % and more preferably from 1.0 to 10 wt %, based on the solution.

The amount of initiators is generally from 0.1 to 10 wt % and preferably from 0.5 to 5 wt %, based on the monomers to be polymerized. Alternatively, a number of different initiators can be used for the emulsion polymerization.

During polymerization, regulators can be used, eg in amounts of from 0 to 0.8 part by weight, based on 100 parts by weight of the monomers to be polymerized, by means of which the molar mass is reduced. Suitable compounds are for example those having a thiol group such as tert-butyl mercaptan, thioglycolic acid ethyl acrylate, mercaptoethynol, mercaptopropyl trimethoxysilane or tert-dodecyl mercaptan.

Emulsion polymerization is usually carried out at from 30° to 130° C. and preferably from 50° to 90° C. The polymerization medium can consist either of water only or of mixtures of water and water-miscible liquids such as methanol. Preferably, only water is used. The emulsion polymerization can be carried out either as a batch process or in the form of an inflow process, including stepwise or gradient processing. Preference is given to the in-flow process, in which a portion of the polymerization recipe is placed in the reactor, heated to the polymerization temperature and incipiently polymerized, after which the rest of the polymerization recipe is fed to the polymerization zone, usually via a number of discrete feed streams, of which one or more contains the monomers in a pure or emulsified form, continuously, stepwise or with superimposed concentration gradient, whilst maintaining polymerization. The particle size achieved during polymerization may be more finely adjusted by the use of a polymer seed in the initial batch.

The manner in which initiator is fed to the polymerization vessel during the course of free-radical aqueous emulsion polymerization is known to the person possessing average skill in the art. It can either be placed as entire batch in the polymerization vessel, or it can be fed in during the free-radical aqueous emulsion polymerization at the rate at which it is consumed, continuously or stepwise. Specifically, this depends on the chemical nature of the initiator system and on the polymerization temperature. Preferably, a portion is used in the initial batch while the rest is fed to the polymerization zone at the rate at which it is consumed.

In order to remove residual monomers, initiator is usually also added on completion of the actual emulsion polymerization, ie after a conversion of the monomers of at least 95% has been achieved.

The individual components can be fed to the reactor during the inflow process downwardly, from the side, or upwardly through the base of the reactor.

The emulsion polymerization produces aqueous dispersions of the polymer usually having a solids content of from 15 to 75 wt %, preferably from 40 to 75 wt %.

In order to attain a high space-time yield of the reactor, dispersions having maximum solids contents are preferred. In order to achieve solids contents>60 wt %, the particle size should be bimodal or polymodal, as otherwise the viscosity is too high and the dispersion is no longer easy to handle. The production of a new particle generation can be achieved for example by the addition of seed (EP 81,083), by the addition of an excess amount of emulsifying agent or by the addition of mini-emulsions. Another advantage gained by low viscosity and high solids is an improvement in the coating properties at high solids contents. The production of one or more new particle generations can take place at any time. It is governed by the particle-size distribution required to give a low viscosity.

The radical-polymerized polymer thus prepared is preferably used in the form of an aqueous dispersion thereof.

Preparation of the polymer dispersion of the invention can be carried out in a simple manner, for example a) by mixing different polymers, eg different polymer dispersions, such as are obtained by emulsion polymerization; (in particular the polymers can differ in that one polymer contains the urea or thiourea groups and another polymer contains the hydrolyzable silicon groups);

b) by adding low-molecular compounds containing urea or thiourea groups to an aqueous polymer dispersion such as may be obtained by, say, emulsion polymerization, in which case the dispersed polymer can already contain hydrolyzable silicon groups;

c) as b) except that the low-molecular compounds contain hydrolyzable silicon groups and the polymer contains urea or thiourea groups d) by adding low-molecular compounds containing urea or thiourea groups and low-molecular compounds containing hydrolyzable silicon groups to an aqueous polymer dispersion;

e) in the preferred embodiment, both the urea or thiourea groups and the hydrolyzable silicon groups are bonded to the polymer, in which case the polymer dispersion of the invention results, for example with the supplementary use of suitable monomers (see above), directly as the product of the emulsion polymerization.

The polymer dispersion of the invention is suitable for use as a binding agent for a variety of applications, eg as a binding agent for coating compositions, eg paints or paper-coating slips.

In particular, it is suitable for use as a binding agent for adhesives and sealants, particularly adhesives for ceramic tiles.

When they are to be used for sealants, the polymers in the aqueous dispersion have a glass transition temperature of preferably from −60° to +40° C., more preferably from −60° to +10° C. and most preferably from −55° to −5° C.

The glass transition temperature can be determined by conventional methods such as differential thermal analysis or differential Scanning Calorimetry (of eg ASTM 3418/82, "midpoint temperature").

When used as adhesives for ceramic tiles, the glass transition temperature is preferably from −10° to +20° C.

When they are to be used as binding agents for sealants or adhesives, the polymer dispersions of the invention are preferably blended with inorganic fillers.

As fillers there may be mentioned aluminum silicates, quartz, precipitated or pyrogenic silicic acid, light and heavy spar, talcum, dolomite and, preferably, calcium carbonate. Also suitable for, say, sealants are coloring fillers, such as titanium white, white lead, zinc white, lithophone and antimony white, black rouge, manganese black, asbolane, antimony black and carbon black, chrome yellow, red lead, zinc yellow, zinc green, pink salt, cadmium red, azure blue, Prussian blue, ultramarine blue, manganese violet, cadmium yellow, molybdate orange and strontium yellow.

When the dispersion is to be used as an adhesive for ceramic tiles, the weight of the fillers is preferably from 100 to 3000 parts by weight and more preferably from 200 to 2000 parts by weight, based on 100 parts by weight of polymer.

When the dispersion is used as a sealant, the weight of the fillers is preferably from 50 to 2000 parts by weight, based on 100 parts by weight of polymer.

Other auxiliaries which can be added to the polymer dispersion for each of the above methods of use are eg plasticizers, levelling agents, thickeners etc.

The use of the polymer dispersions of the invention gives water-resistant and heat-resistant coatings, seals and adhesive bonds.

EXAMPLES

I. Preparation the polymer dispersion
   Basic recipe (V1)
     Initial batch:
          10.6 g  polystyrene seed
          280 g  water
          2.8 g  feed stream 2

-continued

Feed stream 1:
  265 g water
  38.9 g Dowfax ® 2A1 (45 ig), an emulsifier (see above)
  5.8 g Disponil ® FES 77 (30 ig), an ethoxylated fatty alcohol (emulsifier)
  7 g acrylic acid
  3.5 g 3-methacryloxypropyltrimethoxysilane (MEMO)
  344.75 g styrene
  344.75 g ethylhexyl acrylate
Feed stream 2:
  26.6 g water
  1.4 g sodium peroxosulfate The initial batch was incipiently polymerized over a period of 5 minutes, after which feed streams 1 and 2 were started simultaneously and fed in over a period of 180 minutes. Polymerization was then continued at 85° C. for a further 30 minutes, after which the mixture was chemically deodorized and neutralized.

Experiments D1–D3 and V2 were carried out in an analogous manner.

In the experiments D1–D3 of the invention, ureidoethylene methacrylate (UMA) (25% in methyl methacrylate) was added to the feed stream 1 in the amounts given in Table 1.

The amount of styrene in the basic recipe was reduced accordingly.

In Comparative Example V2, no MEMO, but 28 g of UMA only, were used.

TABLE 1

Amounts of MEMO and UMA in the polymer

|  | MEMO | UMA (25% in methyl-methacrylat) |
|---|---|---|
| V1 | 3.5 g | — |
| V2 | — | 28 g |
| D1 | 3.5 g | 8.4 g |
| D2 | 3.5 g | 14 g |
| D3 | 3.5 g | 28 g |

Another experiment D4 was set up in an analogous manner:

Initial batch:
  10.6 g polystyrene seed
  280 g water
  2.8 g feed stream 2
Feed stream 1:
  275 g water
  38.9 g Dowfax 2A1(45 ig)
  5.8 g Disponil FES 77(30% strength)
  7 g acrylic acid
  0.7 g butanediol diacrylate
  1.4 g 3-mercaptopropyltrimethoxysilane
  318 g styrene
  344.9 g ethylhexylacrylate
  28 g ureidoethylene methacrylate (25% strength in methyl methacrylate)
Feed stream 2:
  26.6 g water
  1.4 g sodium peroxosulfate
II Preparation of tile cements and performance tests
  The tile cements were made by mixing the following constituents (parts are by weight).

-continued 67 parts of water
  1 part of Lumiten ® EL (defoamer marketed by BASF)
  5 parts of Walocel ® MW 40000 PFV (cellulose ether marketed by Wolffwalsrode)
  202 parts of dispersion of Examples V1, V2 and D1–D4
  290 parts of Omyacarb ® 130 (chalk, sold by Omya)
  435 parts of Omyacarb ® 40 (chalk, sold by Omya)
Shear strength
  The shear strength was ascertained as stipulated in DIN EN 1324 (3/99).
Shear strength 1: shear strength after 14 days storage in standard climatic conditions + 7 days storage in water
Shear strength 2: shear strength after 7 days storage in standard climatic conditions + 14 days storage at 70° C., tests carried out using warm specimens
Results:

|  | V1 | V2 | D1 | D2 | D3 | D4 |
|---|---|---|---|---|---|---|
| Shear strength 1 [N/mm²] | 0.4 | 0.06 | 0.6 | 0.6 | 0.5 | 0.2 |
| Shear strength 2 [N/mm²] | 0.9 | 1.3 | 1.2 | 1.6 | 1.9 | 1.7 |

What is claimed is:

1. An aqueous polymer dispersion of a polymer obtained by free radical or ionic polymerization, wherein the dispersion contains from 0.0001 to 1 mol of a hydrolyzable silicon group and from 0.0001 to 1 mol of a urea or thiourea group, based, in each case, on 100 g of the polymer present in the dispersion.

2. An aqueous polymer dispersion as defined in claim 1, which is an aqueous dispersion of a radical-polymerized polymer.

3. An aqueous polymer dispersion as defined in claim 1, wherein the urea or thiourea group is bonded to the polymer.

4. An aqueous polymer dispersion as defined in claim 3, wherein the urea or thiourea group is one of the formula

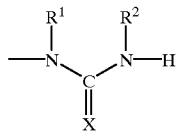

I in which $R^1$ and $R^2$ independently stand for a hydrogen atom or a $C_1$–$C_5$ alkyl group or $R^1$ and $R^2$ together stand for a bridging $C_2$–$C_4$ alkylene group, which can be mono- or di-substituted by a $C_1$–$C_4$ alkoxy group or hydroxyl group, and X stands for O or S.

5. An aqueous polymer dispersion as defined in claim 3 wherein the urea or thiourea group is bonded to the polymer by copolymerization with the ethylenically unsaturated compound of the formula

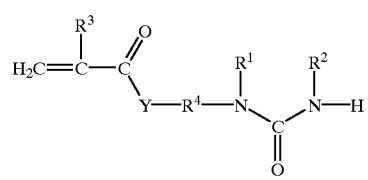

II in which $R^1$ and $R^2$ have the meanings stated above, $R^3$ stands for a hydrogen atom or a methyl group, Y for —O— or —NH— and $R^4$ for a $C_1$–$C_{10}$ alkylene group.

6. An aqueous polymer dispersion as defined in claim 1 wherein the hydrolyzable silicon group is bonded to the polymer.

7. An aqueous polymer dispersion as defined in claim 1 wherein the hydrolyzable silicon group is one of the formula

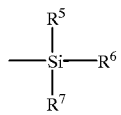

III in which $R^5$ to $R^7$ each independently stand for a $C_1$–$C_8$ alkyl or alkoxy group, provided that at least one of the radicals $R^5$ to $R^7$ stands for an alkoxy group.

8. An aqueous polymer dispersion as defined in claim 1 wherein both the urea or thiourea group and the hydrolyzable silicon group are bonded to the polymer.

9. An aqueous polymer dispersion as defined in claim 1 wherein the dispersed polymer comprises, to an extent of at least 40 wt %, of main monomers selected from the group consisting of $C_1$–$C_{20}$ alkyl (meth)acrylates, vinyl esters of carboxylic acids containing up to 20 carbons, vinyl aromatic compounds containing up to 20 carbons, ethylenically unsaturated nitriles, vinyl halides, vinyl ethers of alcohols containing from 1 to 10 carbons, aliphatic hydrocarbons containing from 2 to 8 carbons and having one or two double bonds, and mixtures of these monomers.

10. A method of sealing a substrate, comprising applying as a sealant to a substrate an aqueous polymer dispersion as defined in claim 1.

11. A method of binding tile cements, comprising applying an aqueous polymer dispersion as defined in claim 1 as a binding agent for said tile cements.

12. A method for adhering a substrate, comprising applying to a substrate as an adhesive an aqueous polymer dispersion as defined in claim 1.

13. A sealed substrate obtained by the method of claim 10.

14. Bonded tile cements obtained by the method of claim 11.

15. An adhered substrate obtained by the method of claim 12.

16. The polymer dispersion of claim 1, wherein the dispersion comprises from 0.0005 mol to 0.05 mol of a urea or thiourea group.

17. The polymer dispersion of claim 4, wherein X is O.

18. The polymer dispersion of claim 5, wherein the unsaturated compound of formula II is 1-(2-methacryloxyethyl)imidazolinone-2.

19. The polymer dispersion of claim 1, wherein the dispersion comprises from 0.0005 mol to 0.01 mol of the hydrolyzable silicon group.

20. The polymer dispersion of claim 1, wherein the molar ratio of the urea or thiourea group to the hydrolyzable silicon group is from 1:5 to 5:1.

* * * * *